United States Patent [19]

Ulug

[11] Patent Number: 4,701,910
[45] Date of Patent: Oct. 20, 1987

[54] RELIABLE LOCAL AREA NETWORK INCLUDING ACTIVE STATIONS

[75] Inventor: Mehmet E. Ulug, Schenectady, N.Y.

[73] Assignee: General Electric Company, Schenectady, N.Y.

[21] Appl. No.: 802,809

[22] Filed: Nov. 29, 1985

[51] Int. Cl.[4] ............................. H04J 3/02; H04J 1/16
[52] U.S. Cl. ........................................ 370/85; 370/13; 340/825.5
[58] Field of Search ....................... 370/85, 86, 13, 17, 370/15; 340/825.5

[56] References Cited

U.S. PATENT DOCUMENTS

4,387,425 6/1983 El-Gohary ............................ 370/85
4,530,085 7/1985 Hamada et al. ...................... 370/15

Primary Examiner—Robert L. Griffin
Assistant Examiner—Curtis Kuntz
Attorney, Agent, or Firm—Richard V. Burgujian; James C. Davis, Jr.; Paul R. Webb, II

[57] ABSTRACT

The subject invention comprises method and apparatus for providing protection against an open transmit cable, an open receive cable and/or a failed BIU in a local area network. Each BIU of the network is adapted to monitor tansmissions received from its predecessor to determine whether the primary transmit channel coupling it to its predecessor is open circuited and, if so, to reestablish communications between it and its predecessor over an auxiliary transmit channel. Further, each BIU is adapted to monitor transmissions received over the primary receive channel of the network to determine whether the channel is idle and, if so, to begin receiving message signals over an auxiliary receive channel. Lastly, a network control center is provided to monitor the transmit medium to determine whether a BIU is "babbling", i.e., transmitting signals for longer than is permitted by the network protocol and, if so, to identify the babbling BIU and, thereafter, remove the babbling BIU from the network.

11 Claims, 8 Drawing Figures

RELIABLE LOCAL AREA NETWORK INCLUDING ACTIVE STATIONS

BACKGROUND OF THE INVENTION

The present invention is directed in general toward communication systems and, more particularly, toward a local area network including active stations wherein protection is provided for failed stations and/or open cables.

Local area networks are becoming more and more prevalent in today's world. With this widespread acceptance comes the need to improve the speed, efficiency and reliability of these systems. The present invention provides method and apparatus for improving the reliability of a local area network including active stations.

Local area networks generally include either passive or active stations. Local area networks having passive stations are those wherein a plurality of bus interface units (BIUs) are coupled to a common transmission line for transmitting information packets therebetween. These systems are desirable in that they allow stations, or BIUs, not having messages to transmit to remain idle, or inactive, while other stations occupy the transmission medium. This is commonly referred to as a broadcast medium.

Local area networks having active stations are those wherein a plurality of BIUs are coupled to a segmented transmission bus such that each BIU receives message packets from a predecessor station and transmits these message packets to a successor station. Commonly, the BIUs are arranged in a ring such that a BIU which originally transmits a message signal to a successor station will remove this message signal from the network when received from its predecessor station. However, these systems have proven unreliable in situations where a station fails, and, therefore, no message packets may be transmitted or received beyond that station. Further, communication may be lost in these systems when a cable is cut or otherwise open circuited. Therefore, it is desirable to provide a local area network having active stations wherein protection is provided against a failed station and/or an open cable.

One prior art method and apparatus for improving the reliability of local area networks including active stations is described as the star net. The star net provides means to short circuit each and every station coupled to the active ring by laying a plurality of cables to bypass open cables and short circuit failed stations. This star net topology is, however, a very costly solution to the reliability problem of an active station local area network.

It is, therefore, desirable to provide a local area network having active stations and providing reliable intercommunication therebetween. Particularly, it is desirable to provide a local area network having active stations wherein protection is provided against failed stations and/or an open cable. It is further desirable to provide such reliability without the need to resort to an expensive starnet topology.

SUMMARY OF THE INVENTION

In accordance with the method of the present invention a local area network includes method and apparatus for providing protection against an open transmit cable, an open receive cable and/or a failed station.

A local area network comprises a receive medium and a transmit medium wherein the transmit medium includes a primary channel and an auxiliary channel. A head end is provided for receiving each message signal transmitted to the auxiliary and primary channels of the transmit medium and transmitting these message signals over the receive medium. A plurality of bus interface units (BIUs) are serially coupled to the transmit medium to receive message signals from a predecessor BIU and transmit message signals to a successor BIU over the primary channel of the transmit medium such that each transmitted message signal is received by the head end. Each BIU is also adapted to receive each message signal transmitted by the head end via the receive medium. Each BIU is responsive to a transmit control signal for transmitting message signals over the auxiliary channel of the transmit medium.

Protection is provided against an open transmit medium by adapting each BIU to determine whether a message signal has been received from its predecessor within a first predetermined network transmission time interval and, if not, to transmit a transmit control message signal to its predecessor such that its predecessor will transmit message signals over the auxiliary channel and, thereby, reestablish network communications.

Protection is provided against an open receive medium by providing the receive medium with a primary channel and an auxiliary channel. The head end is adapted to transmit each message signal received from the transmit medium over the primary and auxiliary channels of the receive medium and to transmit other signals thereover such that the receive medium is not idle. Each BIU is adapted to receive message signals over the primary channel of the receive medium. Each BIU is further adapted to determine whether the primary channel of the receive medium is idle and, if so, to receive message signals over the auxiliary channel of the receive medium.

To provide protection against a failed BIU, the local area network is provided with a network control center which is adapted to monitor the network to detect a "babbling" BIU by determining whether a BIU is transmitting signals for longer than permitted by the network protocol and, if so, to identify the babbling BIU by transmitting a plurality of first modem control signals to each BIU coupled to the network. Each BIU responds to the first modem control signal by temporarily decoupling its transmitter from the transmit medium such that its transmissions are not received by the medium. The network control center monitors the transmission medium after transmitting each first modem control signal to determine whether the babbling has stopped, and, if so, the network control center identifies the recipient of the last transmitted first modem control signal as the babbling BIU. Thereafter, the network control center will transmit a second modem control signal to the babbling BIU wherein the babbling BIU is responsive to the second modem control signal for permanently decoupling its transmitter from the transmit medium.

Therefore, it is an object of the present invention to provide method and apparatus for providing protection against an open transmit cable in a local area network.

It is another object of the present invention to provide method and apparatus for providing protection against an open receive cable in a local area network.

Further, it is an object of the present invention to provide method and apparatus for providing protection against a failed BIU in a local area network.

BRIEF DESCRIPTION OF THE DRAWINGS

Subject matter which is regarded to be invention is particularly pointed out and distinctly claimed in the numbered paragraphs appended hereto. The operation of the invention, however, both as to organization and method of practice, may best be understood by a reading of the following detailed description taken in conjunction with the drawings in which:

DETAILED DESCRIPTION OF THE INVENTION

As mentioned hereinabove, the present invention is directed toward a local area network having active stations wherein protection is provided against open cable and/or failed stations. Briefly, a network control center is provided to monitor the network transmission medium to identify station failures and remove the failed station from the network. Additionally, auxiliary transmit and receive channels are provided such that communication can be established thereover after a primary channel has been open circuited.

Figure 1:
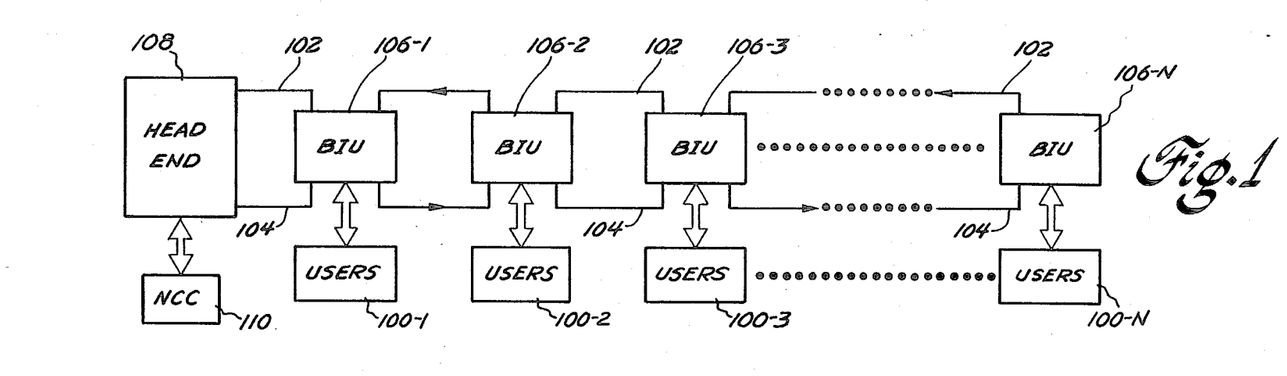
FIG. 1 is an illustrative block diagram of a local area network including apparatus for practicing the method which is the subject of the present invention.

A local area network, including apparatus which is the subject of the present invention, is shown in FIG. 1. Therein, a plurality of user devices 100-1 through 100-N are shown coupled to a transmit medium 102 and a receive medium 104 via a plurality of respective bus interface units (BIUs) 106-1 through 106-N. User devices 100 may comprise any of a plurality of autonomous devices typically found in local area networks. As an example, user devices 100 may comprise personal computing devices, printing devices, memory devices, automated manufacturing devices, etc. While only one user device 100 is shown coupled to each BIU 106 in FIG. 1, it will be appreciated by those skilled in the art that a plurality of user devices 100 may be coupled to each BIU 106 for communication with transmit medium 102 and receive medium 104.

Transmit medium 102 and receive medium 104 may comprise any means for transmitting electrical and/or fiber optic information signals between user devices 100 via BIUs 106. As an example, transmit medium 102 and receive medium 104 may comprise coaxial cable as available from the Belden Electric & Wire Cable Company, for transmitting alternating current modulated digital information signals. As a further example, transmit medium 102 and receive medium 104 may comprise high performance fiber optic cable, such as that available from the Hewlett Packard Company, Part No. HFBR 3001, for transmitting optically modulated digital information signals.

Transmit medium 102 is coupled to receive medium 104 via a head end 108. Head end 108 is provided for receiving message signals from transmit medium 102 and reconstructing the digital information contained therein before transmitting these message signals to receive medium 104. Additionally, head end 108 may comprise a frequency translator such that message signals received from transmit medium 102 over a first frequency may be transmitted to receive medium 104 over a second frequency, as is known in the art. Head end 108 may comprise any suitable device for performing this function.

Head end 108 is coupled for communication with a network control center 110. Network control center 110 is provided for monitoring the local area network to determine whether a station has failed and/or the receive medium has been open circuited. Further, network control center 110 is responsive to either of the foregoing conditions for establishing an alternate communication medium as will be discussed more fully hereinbelow with reference to FIGS. 5-8.

Figure 2:
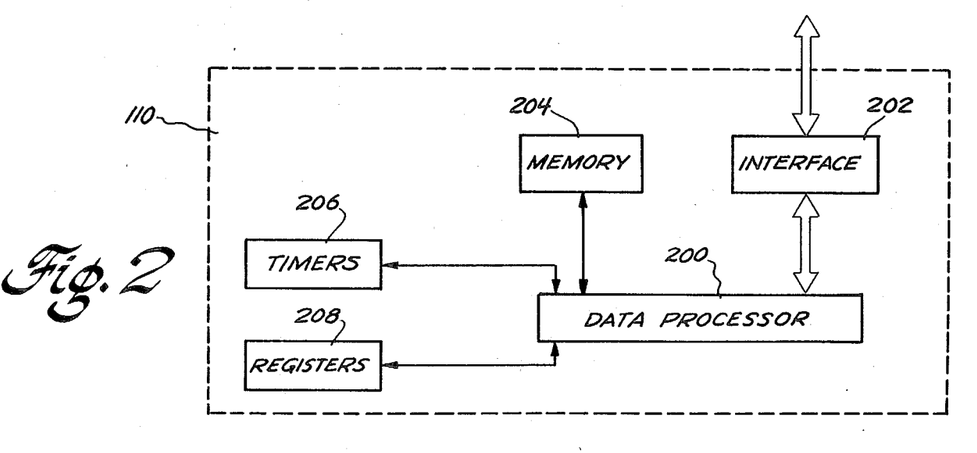
FIG. 2 is a more detailed illustrative block diagram of the network control center of the local area network illustrated in FIG. 1.

As shown in FIG. 2, network control center 110 may comprise a data processor 200 coupled to communicate with head end 108 via a logic circuit interface 202. Data processor 200 may comprise any digital computing device which is adapted, or programmed, for implementing the methods as discussed more fully hereinbelow. As an example, data processor 200 may comprise a 8081 microprocessor as available from the Intel Company. Additionally, data processor 200 may comprise additional peripheral devices such as latches, timers, oscillators, random access memory, read only memory, and such other peripheral devices as is necessary for adapting the aforereferenced digital computing device for executing the method as described herein.

Interface circuitry 202 may comprise any digital circuitry necessary for interfacing data processor 200 with head end 108 such that information may be transferred therebetween.

Data processor 200 is also shown coupled to a BIU address memory 204, timers 206 and registers 208. Each of these devices may comprise standard components for performing their named functions. The operation of each of the devices, like the operation of data processor 200, will be described more fully hereinbelow with reference to FIGS. 5-8.

Each BIU 106-1 through 106-N is provided for transmitting information to transmit medium 102 and receiving information from receive medium 104 such that intercommunication may be provided between its users and other users 100. Further, each BIU 106 is provided for receiving transmitted information from a predecessor station and transmitting this information to a successor station via transmit medium 102 such that each transmission will ultimately be received by head end 108. Similarly, each BIU 106 is adapted for receiving information from its successor station and transmitting this information to its predecessor station via receive medium 104 such that each transmitted message signal may be received by each BIU 106 coupled to the network. In so doing, each BIU 106 may be adapted for implementing the particular protocol of the local area network, which protocol may be similar to that described in U.S. Pat. No. 4,517,670 to Ulug, the disclosure of which is incorporated herein, in its entirety, by the foregoing reference thereto. BIUs 106 may be further adapted to implement any protocol appropriate for the local area network of FIG. 1.

Figure 3:
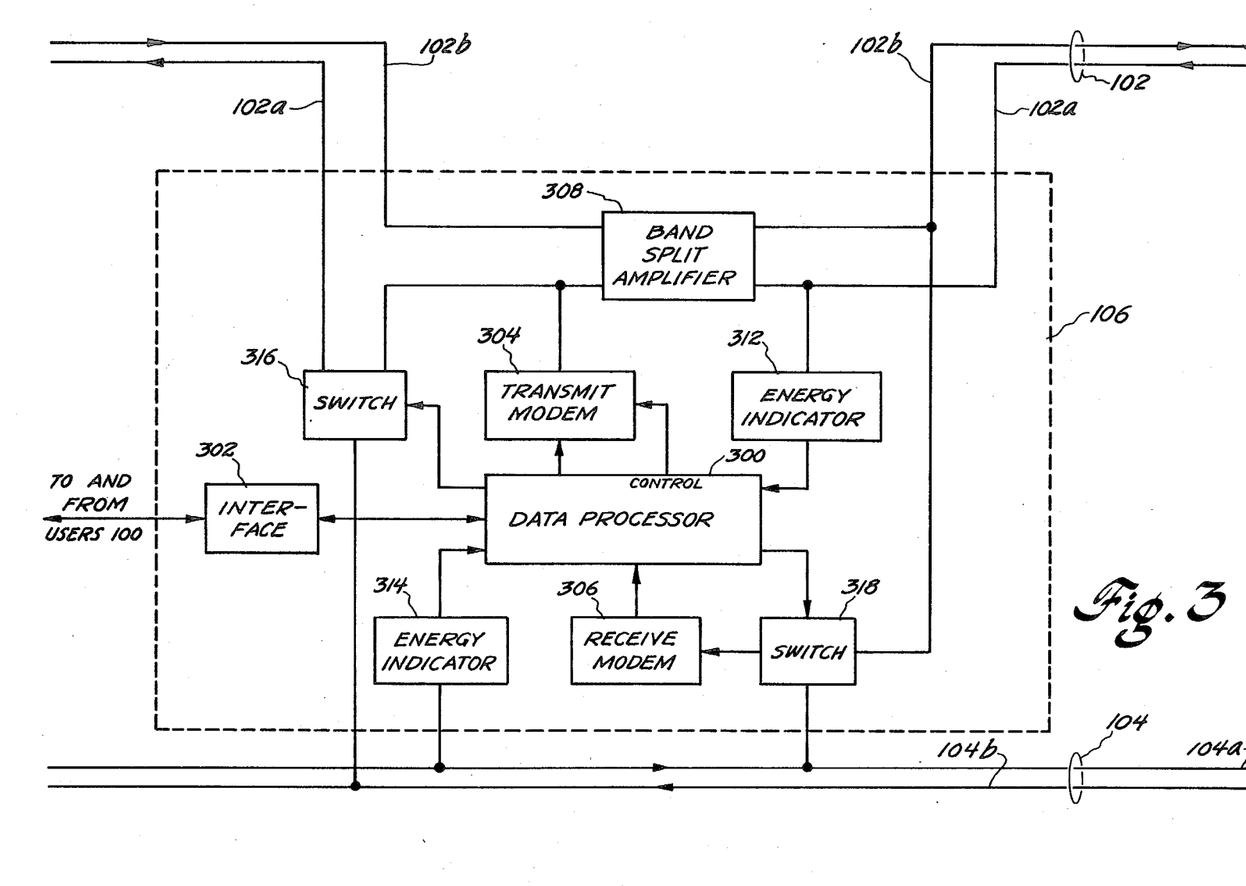
FIG. 3 is a more detailed illustrative block diagram of the BIUs of the local area network illustrated in FIG. 1.

With reference to FIG. 3, there is provided a more detailed illustrative block diagram of each BIU 106. Therein, each BIU 106 is shown to include a data processor 300 coupled for intercommunication with users 100 via a logic circuit interface 302. Data processor 300 is provided for implementing the particular protocol of the local area network and for controlling the transition between a primary transmit channel and a secondary transmit channel as will be discussed more fully hereinbelow by reference to FIGS. 5-8. Data processor 300 may typically comprise one or more microprocessing devices including the necessary peripheral logic circuits for implementing the particular protocol of the local area network as modified herein.

Logic circuit interface 302 may comprise any digital apparatus for adapting information from data processor 300 for use by users 100 and, conversely, for adapting information from users 100 for use by data processor 300.

Data processor 300 is shown coupled to a transmit modem 304 for transmitting message signals to transmit medium 102. Transmit modem 304 is provided for receiving digital information from data processor 300 and for modulating this digital information upon an alternating current carrier before transmitting this information upon transmit medium 102. Similarly, data processor 300 is coupled to receive modem 306 for receiving digital information therefrom. Receive modem 306 is provided for receiving alternating current modulated digital message signals from receive medium 104 and for demodulating these received message signals to recover the digital information contained therein. Further, transmit modem 304 is responsive to control signals received from data processor 300 for decoupling the output from modem 304 from transmit medium 102 such that no transmission energy may be supplied to transmit medium 102 from the modem.

Both transmit modem 304 and receive modem 306 may comprise any element, or plurality of elements for performing their respective transmit and receive functions. It will be appreciated by those skilled in the art that while transmit modem 304 and receive modem 306 are each shown as discrete elements in FIG. 3, they may actually comprise one integrated device for performing both the modulation and demodulation functions described herein. As an example, transmit modem 304 and receive modem 306 may comprise a single integrated device such as a model 30-0078-3 modem available from the Computrol Corporation for receiving and transmitting alternating current modulated digital message signals.

In accordance with the present invention, both transmit medium 102 and receive medium 104 may comprise a first primary channel for transmitting message signals during normal operating conditions. Additionally, both transmit medium 102 and receive medium 104 may comprise a second auxiliary channel for transmitting message signals during a failure condition, i.e., a failed station, an open transmit cable and/or an open receive cable. In the preferred embodiment, transmit medium 102 comprises a primary transmit channel 102a and an auxiliary receive channel 102b wherein transmissions over the primary channel occur at a first electrical frequency and transmissions over the auxiliary channel occur at a second electrical frequency. Similarly, receive medium 104 comprises a primary receive channel 104a and an auxiliary transmit channel 104b wherein transmissions over the primary channel occur at the aforementioned second electrical frequency and transmissions over the auxiliary channel occur at the aforementioned first electrical frequency. Further, in the preferred embodiment, both primary transmit channel 102a and auxiliary receive channel 102b may be contained in the same physical medium 102. This is because transmissions occur at different frequencies over these two channels. Similarly, primary receive channel 104a and auxiliary transmit channel 104b may be contained in the same physical medium 104.

A band split amplifier 308 is provided and serially coupled with transmit medium 102 for receiving message signals from the predecessor of the subject BIU and for transmitting these message signals to the successor of the subject BIU over the primary transmit channel 102a of transmit medium 102. Similarly, band split amplifier 308 is provided for receiving message signals from the successor of the subject BIU and transmitting these message signals to the predecessor of the subject BIU via the auxiliary channel 102b of transmit medium 102. It will be noted that in the preferred embodiment band split amplifier 308 must be further adapted for transmitting and receiving over the primary transmit channel 102a at the aforementioned first electrical frequency. Likewise, band split amplifier 308 must be adapted for transmitting and receiving over the auxiliary receive channel 102b at the aforementioned second electrical frequency. This, however, may be unnecessary should the primary and auxiliary channels of transmit medium 102 be contained in separate physical medium. Band split amplifier 308 may comprise any apparatus for performing the functions described above.

It will be appreciated by those skilled in the art that although the present embodiment is described with reference to a passive receiving network wherein each BIU is coupled in parallel to receive medium 104, an active receiving network, such as that illustrated in FIG. 1, wherein each BIU is serially coupled to receive medium 104 may readily be provided with only slight modification to the present embodiment.

Data processor 300 is also shown coupled to transmit medium 102 and receive medium 104 via energy indicator 312 and energy indicator 314, respectively. Energy indicator 312 is adapted for providing an indication to data processor 300 that a transmission has been provided to the primary transmit channel 102a from the predecessor of the subject BIU 106. In like manner, energy indicator 314 is adapted for providing an indication to data processor 300 that a transmission has been provided to primary receive channel 104a from head end 108 (FIG. 1). As such, energy indicators 312 and 314 may each comprise any means for detecting electrical transmission energy at the aforementioned first and second electrical frequencies and providing an indication thereof to data processor 300. As an example, energy indicators 312 and 314 may each comprise an energy detect circuit such as that shown and described in U.S. Pat. No. 4,517,670. Additionally, each energy indicator may comprise filter circuitry such that only the first or second electrical frequency is sampled over either primary transmit channel 102a or primary receive channel 104a, respectively.

Data processor 300 is also shown coupled to switches 316 and 318. Switch 316 is responsive to a control signal received from data processor 300 for coupling transmit modem 304 and band split amplifier 308 to either primary transmit channel 102a or auxiliary transmit channel 104b. Similarly, switch 318 is responsive to a control signal received from data processor 300 for coupling either primary receive channel 104a or auxiliary receive channel 102b to receive modem 306. Switches 316 and 318 are provided to allow BIU 106 to transmit or receive over the auxiliary channels as will be discussed more fully hereinbelow.

Figure 4:
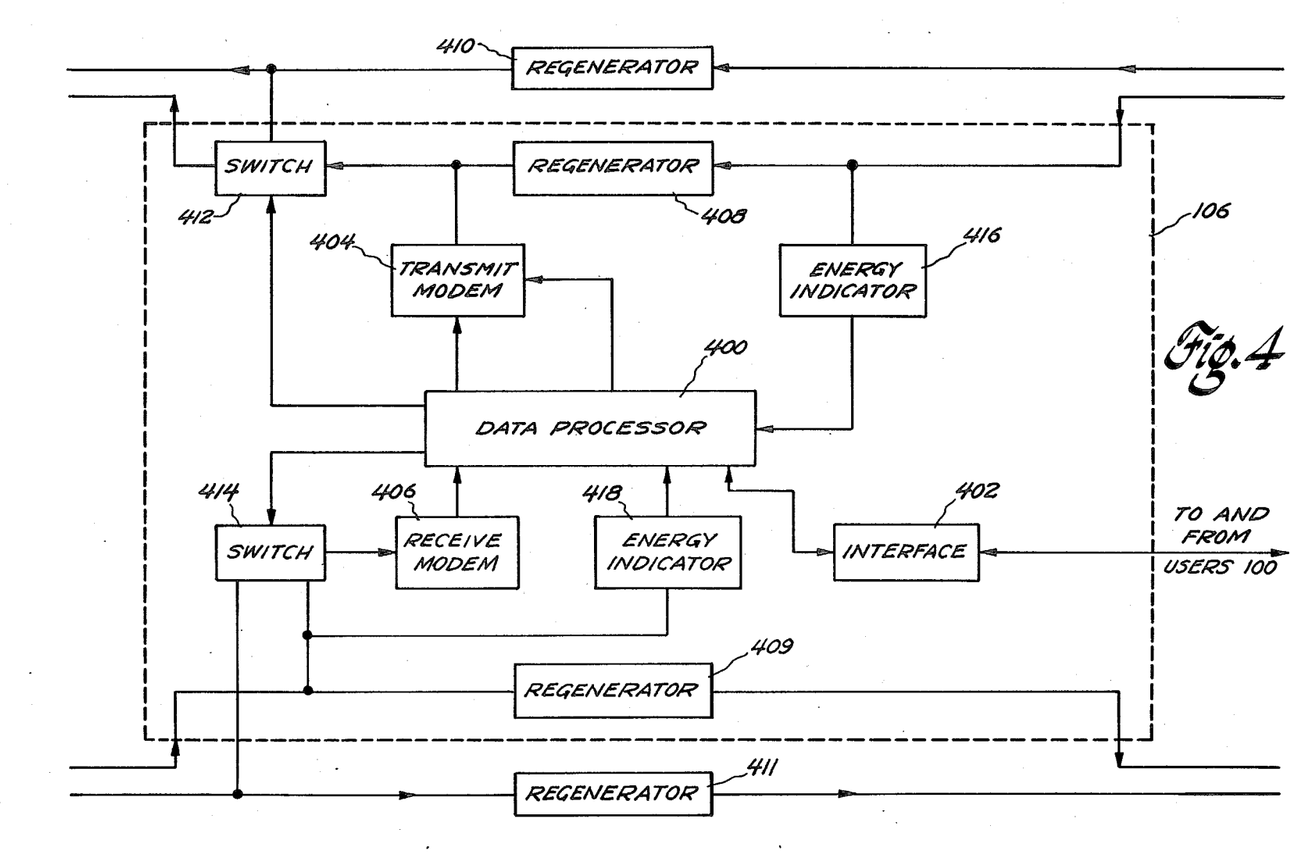
FIG. 4 is an illustrative block diagram of an alternative embodiment of the BIUs of the local area network illustrated in FIG. 1.

It will be appreciated by those skilled in the art that the embodiment of FIG. 3 works well with electrical transmissions wherein an auxiliary channel can be provided in an existing cable by transmitting at an electrical frequency which is distinct from that of primary transmissions over that cable. However, this method may not be possible or desirable in all systems. Therefore, the alternative embodiment of FIG. 4 is provided wherein the auxiliary transmit and receive channels are provided by supplying an alternate transmit and receive cable. It will be appreciated by those skilled in the art that the embodiment of FIG. 4 is particularly suitable for networks wherein transmissions are by way of fiber optic cable.

With reference to FIG. 4, there is shown a BIU 106 adapted for serial interconnection with transmit medium 102 and receive medium 104. In this alternative embodiment, transmit medium 102 comprises a first primary cable 102A and a second auxiliary cable 102B. Similarly, receive medium 104 comprises a first primary cable 104A and a second auxiliary cable 104B.

BIU 106 is shown to comprise a data processor 400 coupled for communicating with users 100 via a logic circuit interface 402. Data processor 400 is also shown coupled to a transmit modem 404 and a receive modem 406 for transmitting message signals to and receiving message signals from transmit medium 102 and receive medium 104, respectively. Transmit modem 404, like transmit modem 304 (FIG. 3), is coupled to data processor 400 to receive a control signal therefrom, which control signal will decouple the output of modem 404 from transmit medium 102.

A pair of regenerators 408 and 410 are provided for receiving message signals from the predecessor of the subject BIU and for transmitting these message signals to the successor of the subject BIU via transmit medium 102. Likewise, a pair of regenerators 409 and 411 are provided for receiving message signals from the successor of the subject BIU and for transmitting these message signals to the predecessor of the subject BIU via receive medium 104. Regenerators 408, 409, 410 and 411 may comprise any means for receiving fiber optic or electrical digital signals and transmitting these fiber optic or electrical digital signals, as is known in the art. It will be appreciated by those skilled in the art that regenerators 408 and 409 are shown as integrated elements of BIU 106 while regenerators 410 and 411 are shown as nonintegrated elements of BIU 106. In this manner, regenerators 410 and 411 may be coupled to a separate power supply than that of regenerators 408 and 409 such that during times when the power of BIU 106 is lost, regenerators 410 and 411 may, nonetheless, continue to be operative.

Data processor 400 is shown coupled to a plurality of switches 412 and 414 for selectively coupling transmit modem 404, regenerator 408 and receive modem 406 to the auxiliary transmit and receive channels as will be discussed more fully hereinbelow with reference to FIGS. 5–8.

An energy indicator 416 is provided and coupled to transmit medium 102 to provide an indication to data processor 400 that a message signal has been provided to transmit medium 102 from the predecessor of the subject BIU 106. Similarly, an energy indicator 418 is provided and coupled to receive medium 104 for providing an indication to data processor 400 that a signal has been provided to receive medium 104 from the successor of the subject BIU. Like energy indicators 312 and 314 of FIG. 3, energy indicators 416 and 418 may comprise any element or element combination for indicating the presence of transmitted energy upon transmit medium 102 and receive medium 104.

It will be appreciated by those skilled in the art that for the method and apparatus of the present invention to be effective against a cut transmit or receive cable, the auxiliary transmit and receive channels must be embodied in cables physically distinct from the cable embodying the primary transmit and receive cable. That is, the auxiliary transmit channel of the embodiment of FIG. 3 is provided in receive cable 104, distinct from transmit cable 102 wherein the primary transmit channel is provided. Similarly, the auxiliary receive channel of the FIG. 3 embodiment is provided in transmit cable 102 which is distinct from receive cable 104 wherein the primary transmit channel is provided. In the embodiment of FIG. 4, four distinct cables are provided to accomodate each of the four transmission channels.

As mentioned hereinabove, the subject invention comprises method and apparatus for providing continued communication notwithstanding a failure condition which may occur in a local area network, e.g., a failed BIU, an open transmit cable, and/or an open receive cable. To this end, network control center 110 (FIG. 1) monitors transmit medium 102 to determine whether signals contained thereon have originated from a "babbling" BIU. As used herein, a babbling BIU refers to a BIU undergoing a failure condition of the type wherein the transmit modem thereof is transmitting signals to transmit medium 102 for longer than is permitted by the network protocol. It will be appreciated by those skilled in the art that during such a condition transmit medium 102 and receive medium 104 will be blocked such that no other BIUs can transmit message signals thereover.

In these instances, upon noting that a BIU is babbling, network control center 110 is adapted for identifying the babbling BIU and removing it from the local area network such that intercommunication among the remaining BIUs may be reestablished. The method by which network control center 110 identifies and removes a babbling BIU from the local area network may best be described by reference to the the decisional flow diagram of FIG. 5.

Figure 5:
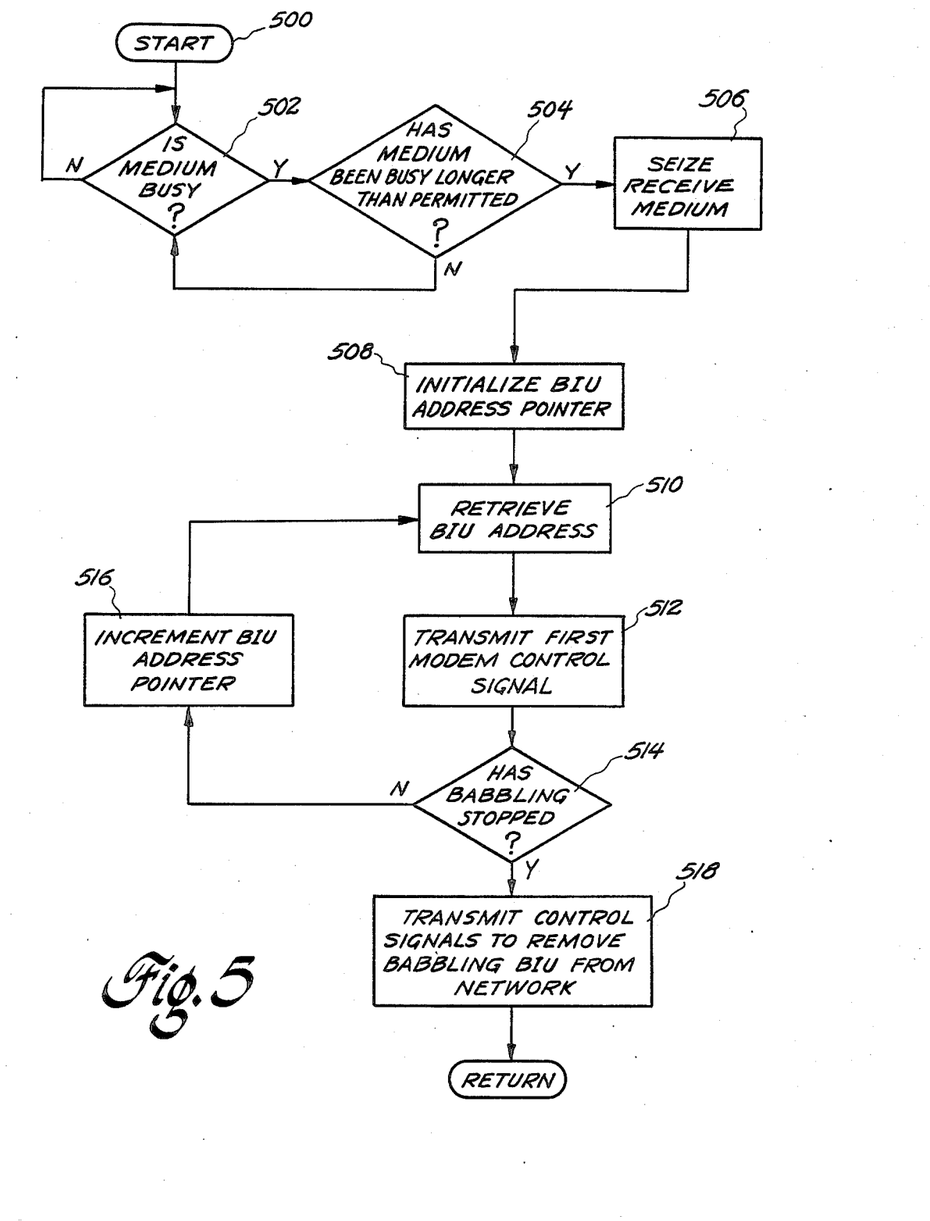
FIG. 5 is a decisional flow diagram of the method by which the apparatus illustrated in FIG. 1 provides protection against a failed BIU.

Therein, the local area network is powered in step 500 and information transfer among BIUs 106 (FIG. 1) is established.

The network control center continually monitors transmissions from head end 108 to determine whether the transmission medium is busy, step 502, and, if so, determines whether the medium has been busy for longer than a predetermined transmit period, step 504. In accordance with the method of the present invention, each station of the local area network is only permitted to transmit message signals for a predetermined amount of time, referred to herein as the transmit interval. Thereafter, the transmitting station must cease its transmission such that another station may begin transmitting its message signals. Hence, when network control center 110 determines that the transmission medium has been busy for longer than the transmit interval, step 504, it assumes that a station is babbling and, therefore, must identify the babbling station and remove it from the local area network.

It will be apparent to those skilled in the art that the transmit interval may be appropriately measured by timers 206 which have been adapted for this purpose. Further, while step 504 is described herein as a step wherein the network control center determines whether the transmit interval has elapsed, this determination may comprise an interaction between timers 206 and data processor 200. Hence, a timer, adapted to measure the transmit interval, may be initiated when the bus is first determined to be busy. The timer may be further adapted to provide an interrupt signal after elapse of the transmit interval. The network control center may be adapted to respond to the interrupt signal by determining that a station is babbling. Many such procedures for measuring time with a data processing device are well known in the art and may be appropriate for use in the present invention.

Returning to FIG. 5, after determining that a station is babbling, network control center 110 must first identify the babbling station before it can be removed from the network. To determine the identity of the babbling BIU, network control center 110 first seizes receive medium 104, step 506, such that the random signals received by head end 108 from transmit medium 102 will not be transmitted over receive medium 104. Thereafter, network control center 110 will initialize a BIU address pointer and retrieve a BIU address from a BIU memory location, steps 508 and 510, as is known in the art. The BIU memory may be a portion of network control center memory 204 (FIG. 2) dedicated for storage of the address of each BIU coupled to the network. In the preferred embodiment, the BIU addresses are stored, and therefore retrieved, in accordance with their physical location along receive medium 104; the address of the BIU must proximate head end 108 being retrieved first and the address of the BIU most remote from head end 108 being retrieved last. With reference to FIG. 1, the address of BIU 106-1 would be retrieved first, that of BIU 106-2 retrieved second and the address of BIU 106-N retrieved last.

Network control center 110 will then transmit a first modem control signal to the BIU identified by the retrieved address via seized receive medium 104, step 512. The first modem control signal is transmitted to the subject BIU instructing data processor 300 thereof (FIG. 3) to decouple transmit modem 304 from transmit medium 102 such that transmissions will not be provided to transmit medium 102. With reference to FIG. 3, this may be provided from the control output of data processor 300 coupled to transmit modem 304 if the transmit modem includes a control input adapted to short circuit the modem output. Alternatively, the control output from data processor 300 may be coupled to a switch, or other controllable coupling means, which is adapted to decouple transmit modem 304 from transmit medium 102. It should be noted that in response to the first modem control signal, data processor 300 is adapted to temporarily decouple transmit modem 304 for a small predetermined time interval, which time interval is chosen to provide network control center 110 with adequate time to determine whether the shorted modem is the babbling modem.

Returning to FIG. 5, network control center 110 will determine whether the babbling has stopped, step 514, and, if not, will increment the BIU address pointer, step 516, retrieve another BIU address, step 510 and transmit another first modem control signal, step 512. Network control center 110 will continue to increment the BIU address pointer and transmit first modem control signals until it determines that the babbling has stopped. At that point the babbling BIU is identified as the last BIU to receive a first modem control signal. Network control center 110 will, therefore, transmit a second modem control signal to the identified babbling BIU, step 518, which control signal will instruct the babbling BIU's data processor 300 to permanently decouple transmit modem 304 such that the random transmissions originating therefrom will not be supplied to transmit medium 102.

It will be noted by those skilled in the art that the method as described above for identifying and removing a babbling BIU from the local area network works equally as well with the alternative embodiment of FIG. 4 as it does with the embodiment of FIG. 3.

In addition to removing babbling BIUs from the local area network, network control center 110 is adapted to determine whether the receive medium of the network has been open circuited. To this end, network control center 110 periodically performs loop back tests to determine whether receive medium 104 has been open circuited and, if so, to also determine where the break has occurred. Further, after identifying the location of the break, network control center 110 is adapted to reestablish local area network communications. The method by which network control center 110 performs the aforementioned loop back tests and reestablishes network communications may be more fully explained by reference to the decisional flow diagram of FIG. 6.

Figure 6:
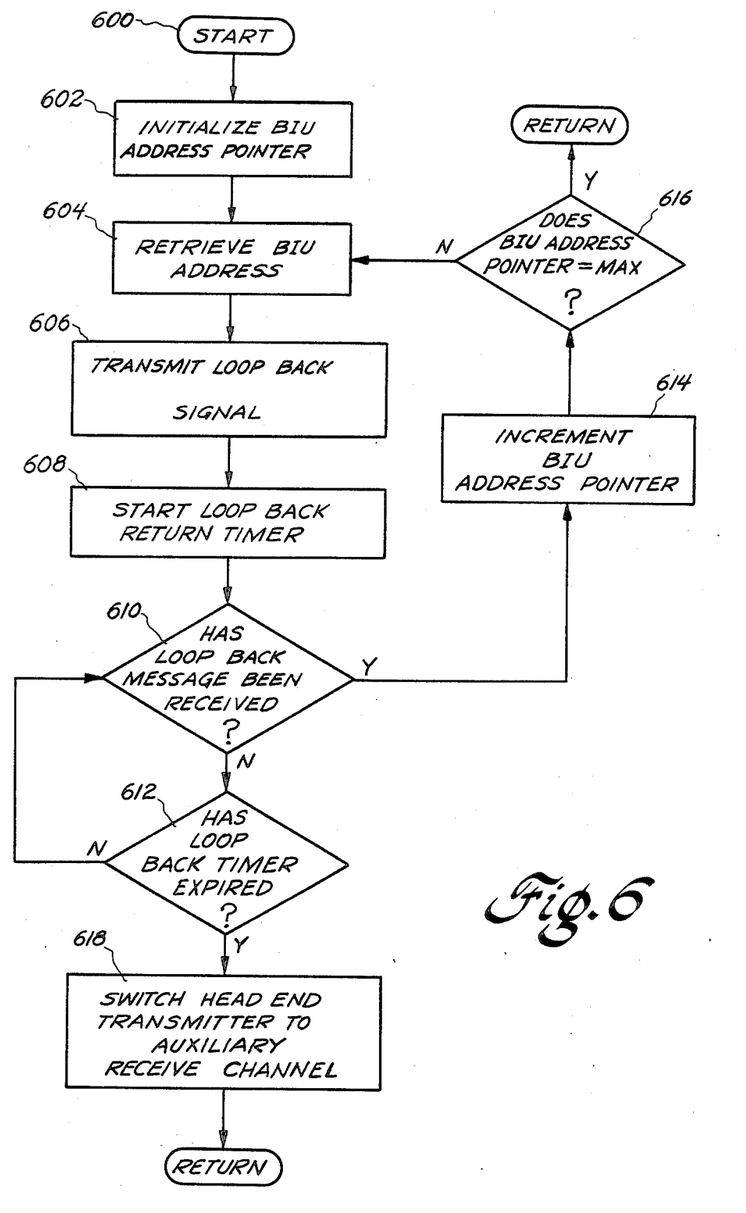
FIG. 6 is a decisional flow diagram of the method by which the apparatus illustrated in FIG. 1 provides protection against an open receive cable.

Therein, the local area network is powered in step 600 and communication between BIUs 106 is established. To perform a loop back test, network control center 110 will first initialize a BIU address pointer, step 602, and retrieve a BIU address from a BIU memory location, step 604. As discussed above, the BIU memory is provided for storing each address of the plurality of BIUs participating in the local area network in the order in which the BIUs are physically coupled to receive cable 104. Network control center 110 will next transmit a loop back signal to the BIU identified by the retrieved address, step 606, and start a loop back return timer, step 608. The loop back return timer is a timing device provided for measuring the return time of the loop back signal. Therefore, it is typically chosen to equal the sum of the total propagation delay along receive medium 104 and transmit medium 102 plus the time interval necessary for each BIU to interpret the loop back signal and respond accordingly. The loop back timer may be comprised of any of a plurality of timing devices which may be included as a portion of timers 206 (FIG. 2).

The loop back signal is a signal which requests a response from the addressee thereof, which response confirms receipt of the signal. Accordingly, after transmission of the loop back signal, network control center 110 monitors transmit medium 102 to determine whether the apropriate response is received from the BIU to which the loop back signal was transmitted, step 610. In the preferred embodiment, an appropriate confirmation to the loop back signal may comprise any signal designated for this purpose, e.g., the loop back signal transmitted to network control center 110 via transmit medium 102 may be adequate.

Network control center 110 will continuously monitor transmit medium 102 for the appropriate response, step 610 and concurrently monitor the loop back timer, step 612 to determine whether the timer expires before the response has been received. If the response is received before the loop back timer expires, i.e., the result of step 610 is answered affirmatively before that of step 612, then network control center 110 will increment the BIU address pointer, step 614, and determine whether each BIU coupled to the local area network has been polled, step 616.

Network control center 110 will continue to execute steps 604 through 616, transmitting loop back signals and awaiting the appropriate response until each BIU address has been polled, step 616, whereupon network control center 110 will return to its normal operation. However, should a station fail to respond before the loop back timer expires, step 612, then network control center 110 will assume that the receive medium has been open circuited intermediate the nonresponding station and the station which previously responded. Therefore, network control center 110 will switch the head end transmitter to the auxiliary receive medium, step 618, such that communication can be reestablished.

To this end, it is noted that in the preferred embodiment head end 108 continuously transmits signals over receive medium 104, intermediate transmission of message signals, such that each BIU 106 will constantly be receiving a signal therefrom. Each BIU thus monitors receive medium 104 at all times and, should a BIU determine that the receive medium is idle, it will activate switch 318 (FIG. 3) or switch 414 (FIG. 4) such that its receive modem will receive messages from the auxiliary receive channel.

With respect to the embodiment of FIG. 3, data processor 300 will continuously monitor the primary channel 104a of receive medium 104 via energy indicator 314. If data processor 300 determines that the primary channel of receive medium 104 is idle, then data processor 300 will control switch 318 to couple receive modem 306 to the auxiliary receive channel 102b of transmit medium 102 such that receive modem 306 can receive message signals thereover. It will be noted by those skilled in the art that since transmissions over the auxiliary channel 102b of transmit medium 102 occur at a second frequency and since transmissions over the primary channel 104a of receive medium 104 occur at this same second frequency, then receive modem 306 will receive message signals from the auxiliary channel of transmit medium 102 via the second frequency.

With respect to the embodiment of FIG. 4, data processor 400 will continuously monitor the primary cable 104A of receive medium 104, via energy indicator 418 to determine whether this cable is idle. Should data processor 400 determine that the primary cable 104A of receive medium 104 is idle, then data processor 400 will control switch 414 to couple receive modem 406 to the auxiliary cable 104B of receive medium 104 such that receptions can occur over this cable.

Returning to FIG. 6, it will be appreciated by those skilled in the art that each BIU coupled to the local area network which is unable to receive message signals will have switched its receive modem to the auxiliary receive channel prior to the network control center's performance of step 618. Further, it will be appreciated by those skilled in the art that each BIU which was previously able to receive messages in spite of the open cirucit will determine that the primary receive channel is idle after network control center 110 performs step 618 and, at that time, will switch its receive modem to receive message signals from the auxiliary receive channel. Hence, shortly after network control center 110 performs step 618 communication among all BIUs will be reestablished over the auxiliary receive channel of the local area network. Alternatively, after performance of step 618, network control center 110 may instruct head end 108 to transmit each message signal over both the auxiliary and primary receive channels.

In still another alternative embodiment, head end 108 may be adapted to continuously transmit over both the primary and auxiliary receive channels. In this embodiment communication will be reestablished after a BIU detects an idle primary receive channel and switches to receive message signals over the auxiliary receive channel, without the need for loop back tests. This embodiment, however, requires a special modem for head end 108 such that it may transmit simultaneously over two physically distinct cables.

Figure 7:
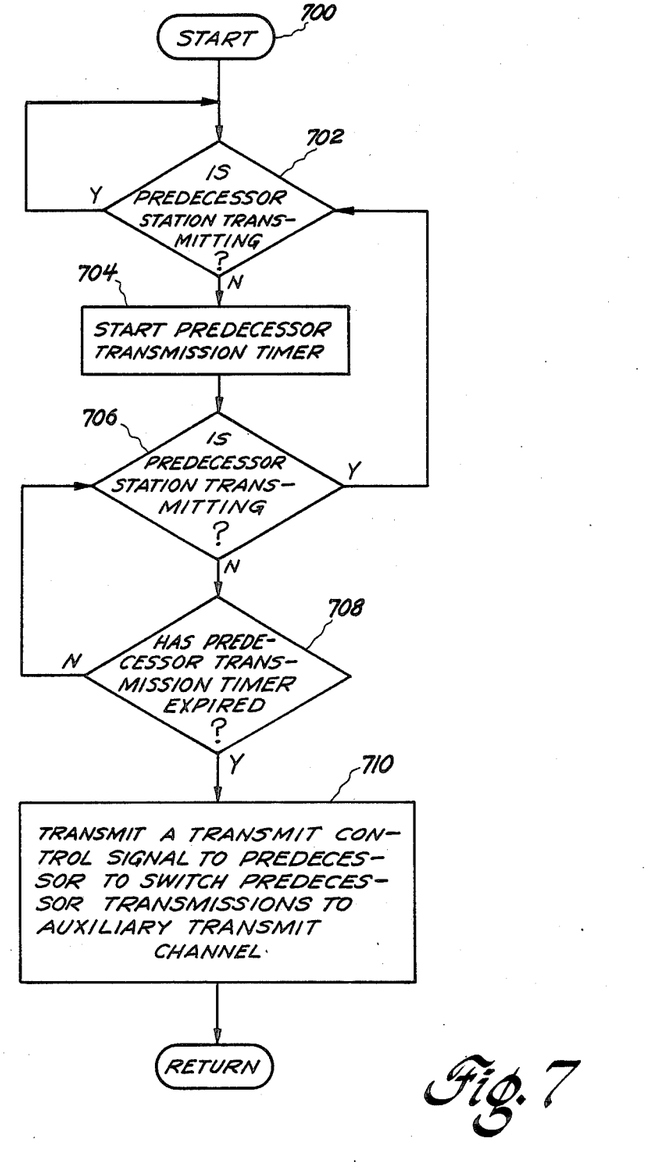
FIG. 7 is a decisional flow diagram of the method by which the apparatus illustrated in FIG. 1 provides protection against an open transmit cable.

As mentioned above, in addition to addressing the problems of open receive medium and babbling BIUs the present invention provides method and apparatus for determining that the transmit medium of a local area network has been open circuited and, thereafter, reestablishing communication in the local area network. This is accomplished by having each BIU monitor transmit medium 102 for receptions from its predecessor station. If a reception is not received within a predetermined amount of time, then the monitoring BIU will assume the cable has been opened intermediate it and its predecessor and will, therefore, transmit a control signal to its predecessor to instruct its predecessor to transmit over the auxiliary transmit channel such that communication within the local area network can be reestablished. With reference to FIG. 7, there is provided a decisional flow diagram of the method by which the BIUs of the present invention perform the aforedescribed function.

Therein, the method is initiated in step 700 wherein the local area network is powered and communication is established between BIUs 106. Each BIU 106 monitors transmit medium 102 via its energy indicator (312 in FIG. 3 and 416 in FIG. 4) to determine whether its predecessor is transmitting, step 702. At times during which its predecessor is not transmitting each BIU will start a predecessor transmission timer, step 704, which timer is provided for measuring the time interval occurring between local area network transmissions. The predecessor transmission timer may be a timer contained within the data processor of the subject BIU and may comprise a device adapted for measuring the maximum time interval allowed between transmissions from the subject stations predecessor. It will be noted, by those skilled in the art, that this time interval will vary as a function of the particular protocol of the network. Also, the time interval will be different for each station coupled to the network, e.g., for BIU 100-1 of FIG. 1, the time interval between transmissions originating from its predecessor will be at a minimum while the time interval will be at a maximum for station 100-(N-1).

After starting the predecessor transmission timer, each BIU will again monitor transmit medium 102 to determine whether its predecessor is transmitting, step 706, and concurrently monitor the predecessor transmission timer, step 708, to determine whether its predecessor begins to transmit before the transmission timer expires. If the predecessor begins to transmit before the predecessor transmission timer expires, then the subject BIU will return to step 702 and again monitor transmit medium 102 until the predecessor stops transmitting, at which time the subject BIU will again start the predecessor transmission timer and again monitor transmit medium 102 to determine whether the predecessor resumes transmitting before the predecessor transmission timer expires. Should the predecessor transmission timer expire before the predecessor begins to transmit, then the subject BIU will assume that transmit medium 102 has been open circuited between it and its predecessor and will, therefore, attempt to reestablish local area network transmissions.

To this end, the subject BIU will transmit a transmit control signal to its predecessor to instruct its predecessor to couple its transmit modem to the auxiliary transmit channel. Thereafter, transmissions will be received by head end 108 from both the primary and auxiliary transmit channels.

With respect to the embodiment of FIG. 3, data processor 300 will respond to a transmit control signal by coupling its transmit modem 304 to the auxiliary channel 104b of receive medium 104 via switch 316 such that transmissions may occur over the auxiliary channel via the first electrical frequency. With respect to the embodiment of FIG. 4, data processor 400 will respond to a transmit control signal by coupling its transmit modem 404 to the auxiliary cable 102B of transmit medium 102 via switch 412 such that transmissions can occur thereover.

It will be noted by reference to FIG. 1, that although a subject BIU may not receive a message signal from its predecessor via transmit medium 102 due to an open cable (and therefore these messages will never reach head end 108 or receive medium 104) that nonetheless it can transmit messages to its predecessor via transmit medium 102, head end 108 and receive medium 104. Further, should the network of FIG. 1 comprise a ring configuration as it is known in the art, a BIU which has identified an open circuit between it and its predecessor can nonetheless transmit message signals to its predecessor.

It will further be appreciated by those skilled in the art that for the method as described above to be effective, it is necessary that each BIU know the address of its predecessor station. This is accomplished via the method of FIG. 8, which method begins with step 800 wherein the local area network is powered for operation. After a brief powering interval, chosen to insure that each BIU is adequately powered to transmit a message signal, each BIU will initiate transmission of a null message signal, step 802. The null message signal is one wherein the destination address thereof is identical to the source address such that the signal is addressed to its originator. Each BIU then determines whether its predecessor station is transmitting, step 804, and, if so, terminates its own transmission, step 806, and stores the address of the successfully transmitted null signal in a predecessor address register, step 808. The predecessor address register may comprise a portion of data processor 300 (FIG. 3 or data processor 400 in FIG. 4) which is provided for storing the address of the subject BIUs predecessor.

Figure 8:
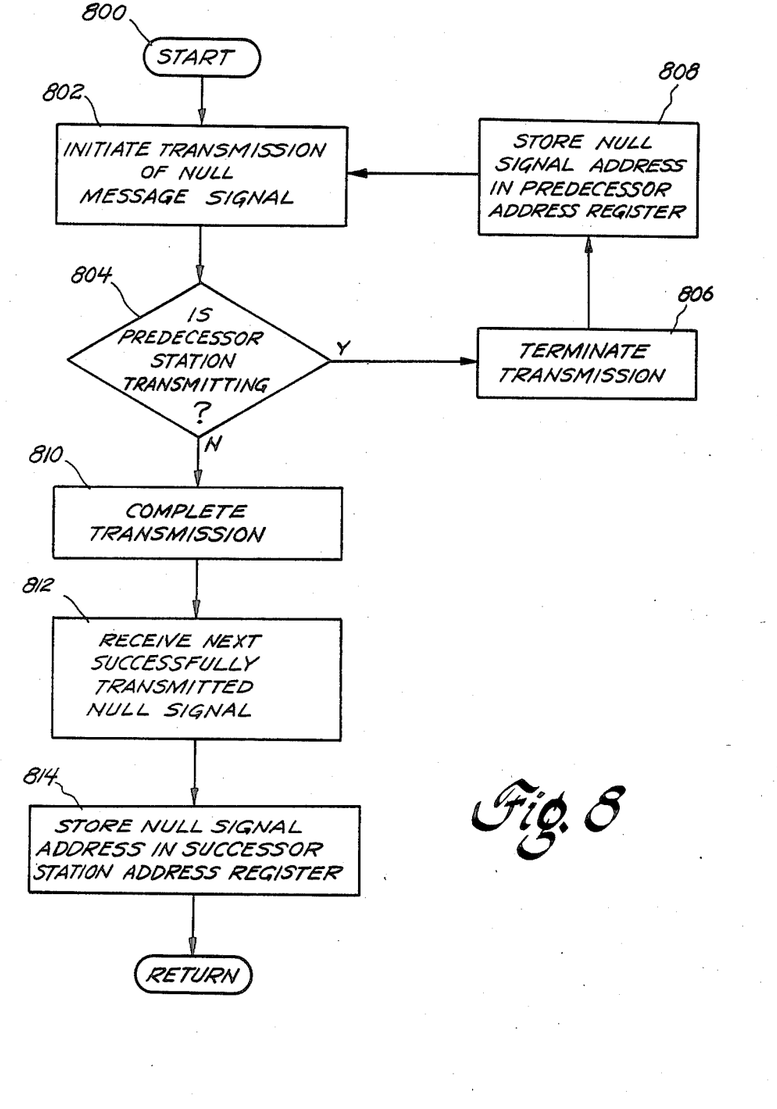
FIG. 8 is a decisional flow diagram illustrating the method by which the BIUs of the local area network illustrated in FIG. 1 determine their predecessors and successors along the transmit medium.

Returning to step 804, should the subject BIU determine that its predecessor is not transmitting, then it will complete transmission of its null signal, step 810. After a station successfully completes its transmission, it no longer attempts to transmit null signals. Hence, each station will cease its transmissions in accordance with its physical location along transmit medium 102 and, therefore, will be able to identify its predecessor and successor as the station which ceases transmission immediately before it and the station which ceases transmission immediately after it. Thus, after the first attempted transmission of null message signals, station 106-N will complete its transmission, step 810, and receive its own null message signal which will identify it as the successful transmitting station. Station 106-(N-1), as well as each remaining station, will determine that its predecessor was transmitting, step 804, will terminate its transmission, step 806, and will store the address of station 106-N in its predecessor address register, step 808. During the next attempted transmission of null message signals, station 106(N-1) will be the successful station and will complete its transmission, step 810. It will be noted that station 106(N-1) has stored in its predecessor address register the address of station 106-N and, therefore, will have identified station 106-N as its predecessor. Further, it will be appreciated that station 106(N-1) will receive the next successfully transmitted null signal, to wit, that of station 106-(N-2), step 812, and will store the address of the transmitting station in its successor register, step 814, thereby identifying this station as its successor. This process will continue until each BIU coupled to transmit medium 102 has identified both its predecessor and successor.

While only several presently preferred embodiments of my novel invention have been provided in detail herein, it will be apparent to those skilled in the art that many modifications and variations thereof may be provided without departing from the true scope and spirit of the invention. It is my intent, therefore, by the paragraphs appended hereto, to claim each such alternative embodiment.

What is claimed is:

1. A local area network wherein protection is provided against an open transmit channel, comprising:
    a primary receive channel, a primary transmit channel and an auxiliary transmit channel;
    head end means for receiving message signals from said auxiliary and said primary transmit channels and transmitting these message signals over said receive channel; and
    a plurality of bus interface unit (BIU) means each serially coupled to said primary transmit channel to receive message signals from a predecessor BIU and transmit these message signals to a successor BIU over said primary transmit channel such that each transmitted message signal is received by said head end means, each said BIU means being also coupled to receive each message signal transmitted by said head end means via said receive channel, each said BIU means being adapted to detect whether said primary transmit channel is open circuited by determining whether a message signal has been received thereover from its predecessor BIU within a first predetermined network transmit interval and, if not, to reestablish communications by transmitting a transmit control signal addressed to its predecessor, its predecessor being responsive to said transmit control signal to transmit message signals over said auxiliary transmit channel.

2. A local area network as recited in claim 1 wherein said primary transmit channel is physically distinct from said auxiliary transmit channel.

3. A local area network as recited in claim 1 further comprising an auxiliary receive channel, said head end means being adapted to transmit message signals received from said primary and said auxiliary transmit channels to said primary and said auxiliary receive channels and to transmit other signals over said primary receive channel intermediate transmission of message signals such that said primary receive channel is not idle, each said BIU means being adapted to receive message signals over said primary receive channel and, each said BIU means being further adapted to detect an open primary receive channel by determining whether said primary receive channel is idle and, if so, to receive message signals over said auxiliary receive channel.

4. A local area network as recited in claim 3 wherein said primary receive channel is physically distinct from said auxiliary receive channel.

5. A local area network as recited in claim 1 wherein said head end means is adapted to transmit other signals over said primary receive channel intermediate transmission of message signals such that said primary receive channel is not idle, said network further comprising:

an auxiliary receive channel, each said BIU means being adapted to determine whether said primary receive channel is idle and, if so, to receive message signals over said auxiliary receive channel; and network control means coupled to said head end means for periodically transmitting loop back signals to each said BIU means over said primary receive channel, each said BIU means being adapted to acknowledge receipt of said loop back signal by transmitting a loop back signal to said network control means, said network control means being adapted to determine that said primary receive channel is open circuited if a BIU means fails to respond and to reestablish communications by controlling said head end means to transmit message signals and said other signals over said auxiliary receive channel.

6. A local area network as recited in claim 5 wherein said primary receive channel is physically distinct from said auxiliary receive channel.

7. A local area network as recited in claim 5 wherein each said BIU means further comprises transmit means for transmitting message signals to the transmit channel and wherein said network control means is further adapted to determine whether one of said plurality of BIU means is a babbling BIU by determining whether a BIU means is transmitting signals for longer than is permitted by the network protocol and, if so, to identify said babbling BIU by transmitting a plurality of first modem control signals over the receive channel to each said BIU means coupled to said network, each said BIU means being responsive to said first modem control signal for temporarily decoupling its said transmit means from the transmit channel, said network control means being further adapted to monitor the transmit channel after transmission of each said first modem control signal to determine whether the babbling has stopped and, if so, to identify the recipient of the last transmitted first modem control signal as said babbling BIU, said network control means being also adapted to transmit a second modem control signal to said babbling BIU, said babbling BIU being responsive to said second modem control signal for permanently decoupling its said transmit means from the transmit channel.

8. A method for maintaining the integrity of the transmit medium of a local area network wherein said transmit medium includes a primary transmit channel and an auxiliary transmit channel, said network including a plurality of active stations each serially coupled to a predecessor station and a successor station for respectively receiving message signals therefrom and transmitting message signals thereto via said primary channel of said transmit medium, said network including a head end for receiving each message signal transmitted over said primary and auxiliary channels and transmitting these message signals to a receive medium, each said station being coupled to said receive medium for receiving message signals therefrom, said method comprising the step of:

each station determining whether a message signal has been received from its predecessor within a first predetermined network transmit interval and, if not, transmitting a transmit control signal to its predecessor, said predecessor being responsive to said transmit control signal for transmitting message signals over said auxiliary channel of said transmit medium.

9. The method as recited in claim 8 wherein said receive medium includes a primary channel and an auxiliary channel, said head end means being adapted to transmit message signals over said primary and said auxiliary channels of said receive medium and to transmit other signals thereover such that said receive medium is not idle, each said BIU means being adapted to receive message signals over said primary channel of said receive medium, said method further comprising the step of:

each said BIU means monitoring said primary channel of said receive medium to determine whether said primary channel is idle and, if so, receiving message signals over said auxiliary channel of said receive medium.

10. The method as recited in claim 8 wherein said receive medium includes a primary channel and an auxiliary channel, said head end means being adapted to transmit message signals over said primary channel of said receive medium and to transmit other signals thereover such that said primary channel is not idle, each said BIU means being adapted to receive message signals over said primary channel of said receive medium, said method further comprising the steps of:

each said BIU means determining whether said primary channel of said receive medium is idle and, if so, receiving message signals over said auxiliary channel of said receive medium;

periodically transmitting loop back signals to each said BIU means over said primary channel of said receive medium, each said BIU means acknowledging receipt of said loop back signal by transmitting a loop back signal over said transmit medium;

monitoring said transmit medium after transmitting each loop back signal for a response from said BIU means and determining that said primary channel of said receive medium is open circuited when a BIU means fails to respond; and said head end means transmitting over said auxiliary channel of said receive medium after said primary channel of said receive medium has been determined to be open circuited.

11. The method as recited in claim 10 further comprising the steps of:

monitoring said transmit medium to determine whether a BIU is babbling, i.e., transmitting for longer than is permitted by the network protocol and, if so, transmitting a first modem control signal to each BIU to determine which BIU is babbling, each said BIU responding to said first modem control signal to temporarily decouple its transmitter from said transmit medium, the babbling BIU being identified as that BIU whose response to said first modem control signal temporarily terminates the babbling detected over said transmit medium; and transmitting a second modem control signal to the babbling BIU, said babbling BIU responding to the second modem control signal for permanently decoupling its transmitter from the transmit medium.

* * * * *